(12) United States Patent
Hasenklever

(10) Patent No.: US 12,392,903 B2
(45) Date of Patent: Aug. 19, 2025

(54) COMPUTER-IMPLEMENTED METHOD AND SYSTEM FOR GENERATING SYNTHETIC SENSOR DATA, AND TRAINING METHOD

(71) Applicant: DSPACE GMBH, Paderborn (DE)

(72) Inventor: Daniel Hasenklever, Paderborn (DE)

(73) Assignee: DSPACE GMBH, Paderborn (DE)

( * ) Notice: Subject to any disclaimer, the term of this patent is extended or adjusted under 35 U.S.C. 154(b) by 820 days.

(21) Appl. No.: 17/436,082

(22) PCT Filed: Mar. 1, 2021

(86) PCT No.: PCT/EP2021/055048
§ 371 (c)(1),
(2) Date: Jan. 12, 2022

(87) PCT Pub. No.: WO2021/175783
PCT Pub. Date: Sep. 10, 2021

(65) Prior Publication Data
US 2022/0326386 A1 Oct. 13, 2022

(30) Foreign Application Priority Data
Mar. 2, 2020 (EP) .................................... 20160370

(51) Int. Cl.
*G01S 17/931* (2020.01)
(52) U.S. Cl.
CPC ................... *G01S 17/931* (2020.01)
(58) Field of Classification Search
CPC ........ G01S 17/931; G01S 17/93; G01S 17/88; G01S 17/00; G01S 2013/9323;
(Continued)

(56) References Cited

U.S. PATENT DOCUMENTS

2018/0329066 A1\* 11/2018 Pacala ........................ G06T 7/50
2019/0004533 A1\* 1/2019 Huang ..................... G01S 17/86
(Continued)

FOREIGN PATENT DOCUMENTS

CN 109507648 A 3/2019
CN 110261868 A 9/2019
(Continued)

OTHER PUBLICATIONS

Vasily Morzhakov, "Sets of autoencoders with shared latent spaces", arxiv:1811.02373v1, Nov. 6, 2018, pp. 1-13, Cornell University, Ithaca, New York, USA.

Jorge Beltran, et al., "A Method for Synthetic LiDAR Generation to Create Annotated Datasets for Autonomous Vehicles Perception", 2019 IEEE Intelligent Transportation Systems Conference (ITSC), Oct. 27-30, 2019, pp. 1091-1096, IEEE, Auckland, New Zealand, XP033668550.

(Continued)

*Primary Examiner* — Mohamed Charioui
(74) *Attorney, Agent, or Firm* — LEYDIG, VOIT & MAYER, LTD.

(57) ABSTRACT

A method generates synthetic sensor data corresponding to a LiDAR sensor of a vehicle, the synthetic sensor data including superimposed distance and intensity information. The method includes: providing a hierarchical variational autoencoder; conditioning a first feature vector and a second feature vector with a second data set, the second data set including distance and intensity information; combining the conditioned first feature vector and the conditioned second feature vector into a resulting third feature vector; and decoding the resulting third feature vector to generate a third data set of synthetic sensor data, the third data set including superimposed distance and intensity information.

10 Claims, 5 Drawing Sheets

(58) Field of Classification Search
CPC ...... G01S 7/417; G01S 17/006; G01S 13/931; G06N 3/045; G06N 3/047; G06N 3/08; G06N 20/00; G06F 30/27
See application file for complete search history.

(56) References Cited

U.S. PATENT DOCUMENTS

| | | | |
|---|---|---|---|
| 2019/0279366 A1 | 9/2019 | Sick et al. | |
| 2019/0378248 A1* | 12/2019 | Ida | G06N 3/048 |
| 2020/0174130 A1* | 6/2020 | Banerjee | B60R 11/04 |

FOREIGN PATENT DOCUMENTS

| | | |
|---|---|---|
| DE | 102010049214 A1 | 7/2011 |
| DE | 102017006155 A1 | 12/2017 |
| DE | 102017116017 A1 | 1/2019 |
| DE | 102017213692 A1 | 2/2019 |
| DE | 102018114231 A1 | 12/2019 |

OTHER PUBLICATIONS

Tim Allan Wheeler, et al., "Deep Stochastic Radar Models" arxiv:1701.09180v1, Jan. 31, 2017, pp. 1-7, Cornell University, Ithaca, New York, USA, XP080752628.

Zixuan Huang et al., HMS-Net: Hierarchical Multi-scale Sparsity-invariant Network for Sparse Depth Completion, Journal of latex class files, Aug. 2015, pp. 1-13, vol. 14, No. 8, arXiv: 1808.08685v2.

Guo Yun-Fei et al., SIM-GM-PHD algorithm for low observable target tracking, Automation School, Hangzhou Dianzi University, Jan. 2018, vol. 33, No. 1, pp. 1-6, China Academic Journal Electronic Publishing House, Hangzhou 310018, China.

Qing Du et al., Progress of neural network-based 3D point cloud generation modeling research, Robot Technique and Application, Jun. 2019, pp. 1-4, School of Computer Science, Guangdong University of Technology, Guangzhou, 510006, China.

* cited by examiner

|   |   |   |   |   |
|---|---|---|---|---|
| 1 | 1 | 1 | 1 | 1 |
| 1 | 1 | 1 | 1 | 1 |
| 1 | 1 | 0 | 0 | 0 |
| 0 | 0 | 0 | 0 | 0 |
| 0 | 0 | 0 | 0 | 0 |

Z

COMPUTER-IMPLEMENTED METHOD AND SYSTEM FOR GENERATING SYNTHETIC SENSOR DATA, AND TRAINING METHOD

CROSS-REFERENCE TO PRIOR APPLICATIONS

This application is a U.S. National Phase application under 35 U.S.C. § 371 of International Application No. PCT/EP2021/055048, filed on Mar. 1, 2021, and claims benefit to European Patent Application No. EP 20160370.1, filed on Mar. 2, 2020. The International Application was published in German on Sep. 10, 2021 as WO 2021/175783 A1 under PCT Article 21(2).

FIELD

The present invention relates to a computer-implemented method for generating synthetic sensor data from an environment sensor, in particular a LiDAR sensor, of a vehicle, the synthetic sensor data including superimposed distance and intensity information.

The invention also relates to a system for generating synthetic sensor data from an environment sensor, in particular a LiDAR sensor, of a vehicle, the synthetic sensor data including superimposed distance and intensity information.

The present invention further relates to a computer-implemented method for providing a trained machine learning algorithm for generating synthetic sensor data from an environment sensor, in particular a LiDAR sensor, of a vehicle, the synthetic sensor data including superimposed distance and intensity information.

Moreover, the present invention relates to a computer program and a computer-readable data carrier.

BACKGROUND

Graphical user interfaces for testing highly-automated driving functions of a motor vehicle typically have a plurality of components which allow parameter set management, generation of a virtual vehicle environment, as well as experiment management.

The setting up of a scene of the virtual vehicle environment; i.e., the definition of static and dynamic objects, is accomplished through configuration and import of objects stored in an object library.

For example, to generate LiDAR data, typically complex test drives in a real environment are required to obtain the corresponding data. Therefore, it is desirable to synthetically generate LiDAR sensor data. A LiDAR point cloud generally includes two features: the intensity of objects and the distance of objects from the LiDAR sensor.

While the distance can be modeled relatively easily by geometry, the intensity is based on reflectivity values of materials, which in turn are dependent on the angle of incidence and the type of reflection.

In order to be able to model the intensity in a virtual environment, the material properties of the objects to be modeled are calibrated. Calibration of materials is expensive on the one hand and, on the other hand, is possible only in finitely many numbers.

At the same time, modeling of measurement noise and sensor noise profiles in a model-based manner is very complex. The reality of synthetic data is limited by factors such as realistic surface structure, noise, multi-path propagation, and lack of knowledge of material properties.

SUMMARY

In an exemplary embodiment, the present invention provides a method for generating synthetic sensor data corresponding to a LiDAR sensor of a vehicle, the synthetic sensor data including superimposed distance and intensity information. The method includes: providing a hierarchical variational autoencoder, wherein the hierarchical variational autoencoder has a first level of hierarchy and a second level of hierarchy, and wherein the hierarchical variational autoencoder has a third level of hierarchy or is configured to communicate with a third level of hierarchy of an external variational autoencoder; receiving, by a variational autoencoder of the first level of hierarchy, a first data set of LiDAR sensor data including distance information, wherein the first data set comprises synthetically generated and/or captured real sensor data, the variational autoencoder of the first level of hierarchy assigning global features of the first data set to a first codebook vector; receiving, by a variational autoencoder of the second level of hierarchy, the first data set, the variational autoencoder of the second level of hierarchy assigning local features of the first data set to a second codebook vector; conditioning a first feature vector encoded by the variational autoencoder of the first level of hierarchy and a second feature vector encoded by the variational autoencoder of the second level of hierarchy with a second data set of LiDAR sensor data from the LiDAR sensor of the vehicle, the second data set including distance and intensity information; combining the conditioned first feature vector and the conditioned second feature vector into a resulting third feature vector; and decoding the resulting third feature vector to generate a third data set of synthetic LiDAR sensor data, the third data set including superimposed distance and intensity information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

In the drawings, like reference numerals designate like elements unless otherwise indicated.

DETAILED DESCRIPTION

Figure 1:
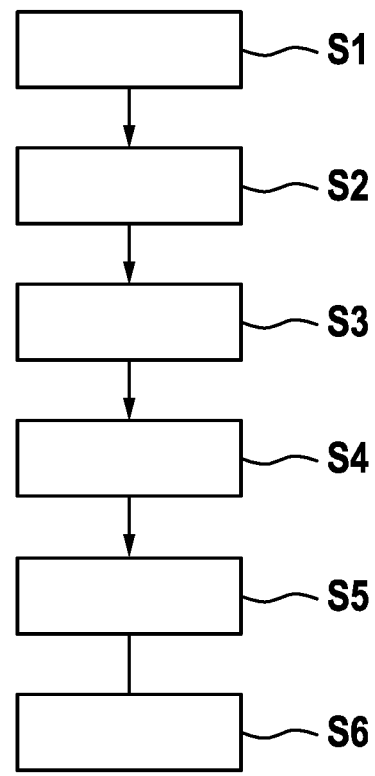
FIG. 1 is a flow diagram of a computer-implemented method for generating synthetic sensor data from an environment sensor of a vehicle in accordance with an embodiment of the invention.

Exemplary embodiments of the present invention improve existing methods and systems for generating synthetic sensor data from an environment sensor, in particular a LiDAR sensor, of a vehicle in such a way that they allow the virtual vehicle environment to be generated in a simplified, more efficient, and less expensive manner.

Exemplary embodiments of the invention provide a computer-implemented method, a system, a computer-implemented training method, a computer program, and a computer-readable data carrier which allow for a simplified, more efficient, and less expensive generation of synthetic sensor data from an environment sensor, in particular a LiDAR sensor, of a vehicle.

In an exemplary embodiment, the present invention provides a computer-implemented method for generating synthetic sensor data from an environment sensor, in particular a LiDAR sensor, of a vehicle, the synthetic sensor data including superimposed distance and intensity information.

In an exemplary embodiment, the present invention provides a system for generating synthetic sensor data from an environment sensor, in particular a LiDAR sensor, of a vehicle, the synthetic sensor data including superimposed distance and intensity information.

In an exemplary embodiment, the present invention provides a computer-implemented method for providing a trained machine learning algorithm for generating synthetic sensor data from an environment sensor, in particular a LiDAR sensor, of a vehicle, the synthetic sensor data including superimposed distance and intensity information.

In an exemplary embodiment, the present invention provides a computer program. In an exemplary embodiment, the present invention provides a non-transitory computer-readable data storage medium.

The invention relates to a computer-implemented method for generating synthetic sensor data from an environment sensor, in particular a LiDAR sensor, of a vehicle, the synthetic sensor data including superimposed distance and intensity information.

The method may include providing a hierarchical variational autoencoder which has a first level of hierarchy, a second level of hierarchy, and a third level of hierarchy, or is configured to communicate with the third level of hierarchy of an external variational autoencoder.

The method may also include receiving, by a variational autoencoder of the first level of hierarchy, a first data set of sensor data including distance information, in particular synthetically generated and/or captured real sensor data, from the environment sensor of the vehicle, the variational autoencoder of the first level of hierarchy assigning global features of the first data set of sensor data to a first codebook vector.

The method may further include receiving, by a variational autoencoder of the second level of hierarchy, the first data set of sensor data from the environment sensor of the vehicle, the variational autoencoder of the second level of hierarchy assigning local features of the first data set of sensor data to a second codebook vector.

The method may still further include conditioning a first feature vector encoded by the variational autoencoder of the first level of hierarchy and a second feature vector encoded by the variational autoencoder of the second level of hierarchy with a second data set of sensor data from the environment sensor of the vehicle, the second data set including distance and intensity information.

The method may also include combining the conditioned first feature vector and the conditioned second feature vector into a resulting third feature vector, and decoding the resulting third feature vector to generate a third data set of synthetic sensor data from the environment sensor of the vehicle, the third data set including superimposed distance and intensity information.

The synthetic sensor data of the environment sensor of the vehicle is a computer-generated representation of the real vehicle environment captured by one or more sensors.

The invention also relates to a system for generating synthetic sensor data from an environment sensor, in particular a LiDAR sensor, of a vehicle, the synthetic sensor data including superimposed distance and intensity information.

The system may include a hierarchical variational autoencoder which has a first level of hierarchy, a second level of hierarchy, and a third level of hierarchy, or is configured to communicate with the third level of hierarchy of an external variational autoencoder.

The hierarchical variational autoencoder may be configured to receive a first data set of sensor data including distance information, in particular synthetically generated and/or captured real sensor data, from the environment sensor of the vehicle through a variational autoencoder of the first level of hierarchy that assigns global features of the first data set of sensor data to a first codebook vector.

The hierarchical variational autoencoder may be configured to receive the first data set of sensor data from the environment sensor of the vehicle through a variational autoencoder of the second level of hierarchy that assigns local features of the first data set of sensor data to a second codebook vector.

The hierarchical variational autoencoder may further be configured to condition a first feature vector encoded by the variational autoencoder of the first level of hierarchy and a second feature vector encoded by the variational autoencoder of the second level of hierarchy with a second data set of sensor data from the environment sensor of the vehicle, the second data set including distance and intensity information.

In addition, the hierarchical variational autoencoder may be configured to combine the conditioned first feature vector and the conditioned second feature vector into a resulting third feature vector.

Furthermore, the hierarchical variational autoencoder may be configured to decode the resulting third feature vector to generate a third data set of synthetic sensor data from the environment sensor of the vehicle, the third data set including superimposed distance and intensity information.

Moreover, the invention relates to a method for providing a trained machine learning algorithm for generating synthetic sensor data from an environment sensor, in particular a LiDAR sensor, of a vehicle, the synthetic sensor data including superimposed distance and intensity information.

The method may include providing a hierarchical variational autoencoder which has at least a first level of hierarchy and a second level of hierarchy.

The method may further include receiving input training data and output training data of a first autoregressive artificial neural network, in particular of an artificial convolutional neural network, of the first level of hierarchy.

The method may also include training the first autoregressive artificial neural network, in particular the artificial convolutional neural network, of the first level of hierarchy to assign global features of the input training data to a first codebook vector.

The method may further include receiving input training data and output training data of a second autoregressive artificial neural network, in particular of an artificial convolutional neural network, of the second level of hierarchy.

In addition, the method may include training the second autoregressive artificial neural network, in particular the artificial convolutional neural network, of the second level of hierarchy to assign local features of the input training data to a second codebook vector, the second autoregressive artificial neural network of the second level of hierarchy being conditioned by the autoregressive artificial neural network of the first level of hierarchy.

Exemplary embodiments of the present invention provide for transforming, using the aforedescribed algorithm structure including a hierarchical variational autoencoder and an additional conditioning layer, a given, distance information-containing data set of synthetic sensor data, in particular LiDAR data, in such a way that a transformed or improved data set including synthetic sensor data from an environment sensor of a vehicle, the synthetic sensor data including an approximation of superimposed distance and intensity information, can be generated by conditioning the given data set with another data set composed of both distance and intensity data from a vehicle sensor.

Further embodiments of the present invention are discussed below with reference to the figures.

An embodiment of the invention provides that the first data set of sensor data be encoded by a first encoder of the hierarchical variational autoencoder, an image resolution of the first data set being reduced by a predetermined factor, in particular $2^4$. This advantageously makes it possible to generate a representation of the first data set that is dimensionally reduced by the predetermined factor.

Another embodiment provides that the first data set of sensor data encoded by the first encoder be divided into the first level of hierarchy and the second level of hierarchy, the first data set of sensor data being encoded in the first level of hierarchy by a second encoder of the hierarchical variational autoencoder, and an image resolution of the first data set being reduced by a predetermined factor, in particular $2^2$. Thus, in the first level of hierarchy, the first data set advantageously undergoes a further dimensional reduction by the predetermined factor.

A further embodiment provides that the first data set of sensor data encoded into a first feature vector by the second encoder be assigned to the first codebook vector which has the smallest distance to the first feature vector, the assignment being performed by a first autoregressive artificial neural network, in particular an artificial convolutional neural network, of the first level of hierarchy.

This advantageously allows the generated feature vector, which vectorially combines the numerically parameterizable properties of the fist data set, to be assigned to the first codebook vector in the best possible way.

Another embodiment provides that the first codebook vector be decoded by a first decoder of the hierarchical variational autoencoder, the image resolution of the first codebook vector being increased by a predetermined factor, in particular $2^2$. Thus advantageously allows for efficient, dimensionally augmented representation of the first codebook vector.

A further embodiment provides that the first data set output by the first decoder of the first level of hierarchy and the first data set encoded by the first encoder of the hierarchical variational autoencoder be combined into the resulting third feature vector in the second level of hierarchy.

Thus, the first data set of the first level of hierarchy, which includes global features of the original first data set, conditions the first data set of the second level of hierarchy.

Another embodiment provides that the resulting third feature vector be assigned to the second codebook vector which has the smallest distance to the resulting third feature vector, the assignment being performed by a second autoregressive artificial neural network, in particular an artificial convolutional neural network, of the second level of hierarchy.

This advantageously allows the third feature vector to be assigned to the second first codebook vector in the best possible way.

A further embodiment provides that the second data set of sensor data from the environment sensor of the vehicle be encoded by a third encoder in the third level of hierarchy, an image resolution of the second data set being reduced by a predetermined factor, in particular $2^8$. This advantageously makes it possible to generate a representation of the second data set that is dimensionally reduced by the predetermined factor.

Another embodiment provides that the second data set of sensor data encoded into a fourth feature vector by the third encoder be assigned to a third codebook vector which has the smallest distance to the fourth feature vector of the second data set, the assignment being performed by a third autoregressive artificial neural network, in particular an artificial convolutional neural network, of the third level of hierarchy.

This advantageously allows the fourth feature vector to be assigned to the third first codebook vector in the best possible way.

A further embodiment provides that the third codebook vector be decoded by a second decoder of the hierarchical variational autoencoder or by the external variational autoencoder, the second data set output by the second decoder conditioning the first feature vector encoded by the variational autoencoder of the first level of hierarchy and the second feature vector encoded by the variational autoencoder of the second level of hierarchy.

The conditioning of the first level of hierarchy and the second level of hierarchy by the output data of the third level of hierarchy can advantageously make it possible to condition the first level of hierarchy and the second level of hierarchy.

This can make it possible to transform the data set of the first level of hierarchy and of the second level of hierarchy or the combined data set of the first level of hierarchy and of the second level of hierarchy.

This has the beneficial effect of enabling modeling or generation of synthetic sensor data which includes distance information as well as transformed and thus improved intensity information.

The transformation and the resulting improvement of the first data set is made possible by the conditioning with the second data set, in particular with the captured real sensor data of the second data set.

Another embodiment provides that the first feature vector encoded by the variational autoencoder of the first level of hierarchy and the second feature vector encoded by the variational autoencoder of the second level of hierarchy be conditioned with a data set label, the data set label indicating whether the sensor data is synthetically generated or captured real sensor data.

This additional conditioning of the data of the first level of hierarchy and of the second level of hierarchy by the data set label advantageously allows for improved modeling of the objective function or of the synthetic sensor data to be output from the environment sensor via the autoregressive artificial neural network of the first and/or second level(s) of hierarchy.

The method features described herein are applicable to a multiplicity of virtual environments such as, for example, the testing of autonomous vehicles, aircraft and/or spacecraft.

Figure 2:
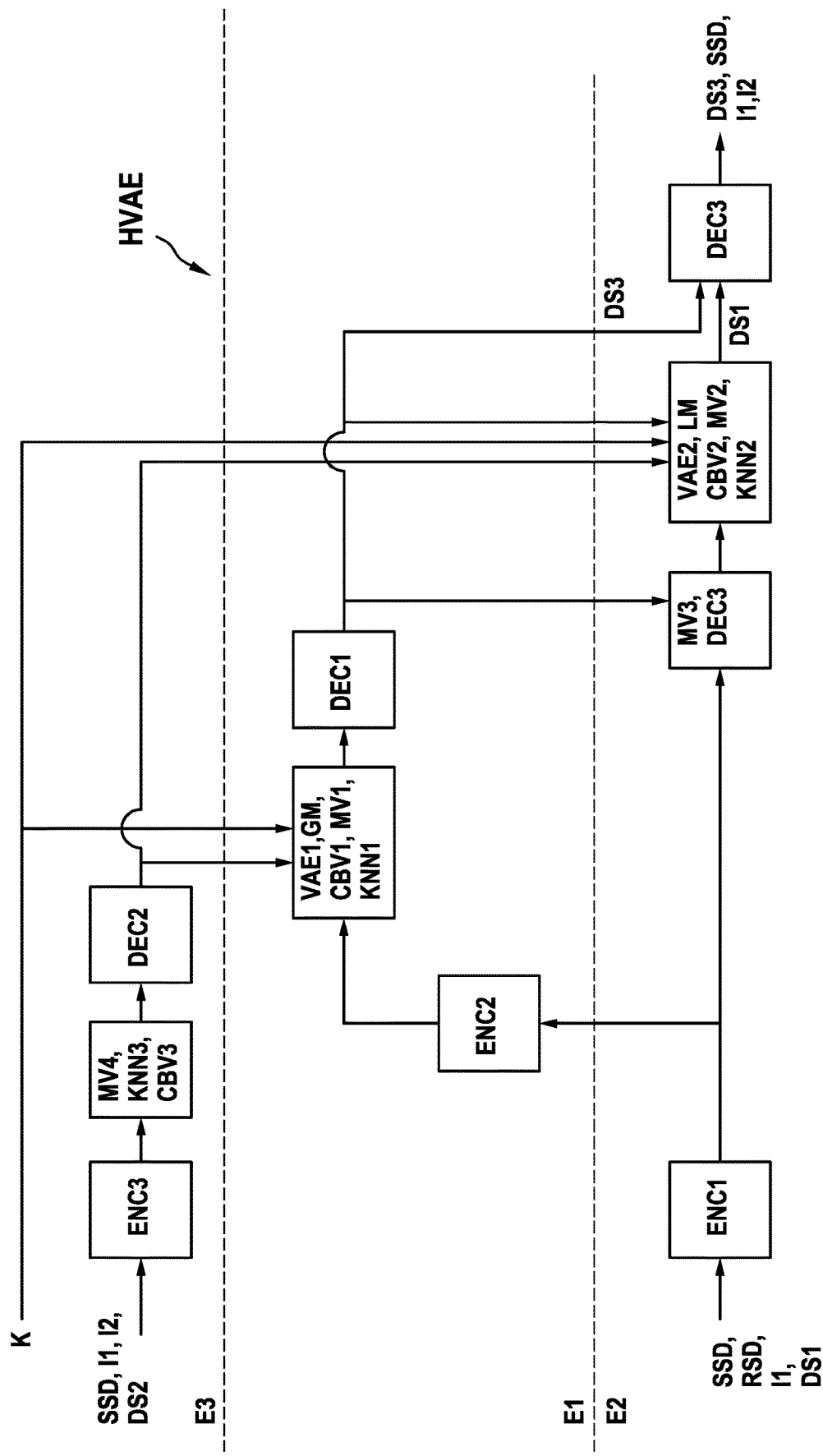
FIG. 2 is a detailed flow and system diagram of the method and system for generating synthetic sensor data from an environment sensor of a vehicle in accordance with an embodiment of the invention.

FIG. 1 shows a flow diagram and FIG. 2 shows a detailed flow and system diagram of a method and system for generating synthetic sensor data from an environment sensor of a vehicle in accordance with an embodiment of the invention.

In an embodiment of the invention, the synthetic sensor data SSD of the environment sensor is sensor data from a LiDAR sensor of a vehicle.

Alternatively, the environment sensor may be, for example, a camera sensor or a radar sensor.

For example, if a camera sensor is used, the distance information contained in video image data can be calculated geometrically. The intensity information may be encoded using, for example, grayscale values or RGB color channels.

If a radar sensor is used, the intensity information may be encoded using, for example, image brightness. In this context, brighter pixel values represent higher reflection from objects and a resulting higher image intensity, whereas darker pixel values represent less reflection from objects and thus lower image intensity.

The following description refers to both FIG. 1 and FIG. 2. The method and system include providing S1 a hierarchical variational autoencoder HVAE which has a first level of hierarchy E1, a second level of hierarchy E2, and a third level of hierarchy E3.

Alternatively, the third level of hierarchy E3 may, for example, not be part of the hierarchical variational autoencoder HVAE, but form an external level of hierarchy E3. In this case, the hierarchical variational autoencoder HVAE is configured to communicate with the external third level of hierarchy E3 of an external variational autoencoder.

A variational autoencoder includes an artificial neural network which is used to learn efficient data encodings in an unsupervised manner. The aim of a variational autoencoder is to learn a representation or encoding for a set of data, typically for dimensionality reduction.

Unlike classical autoencoders, variational autoencoders are generative models, the association with a classical autoencoder deriving mainly from the architectural affinity; i.e., from an encoder and a decoder.

However, their mathematical formulation differs significantly. Variational autoencoders are weighted probabilistic graphical models whose objective function is approximated by a neural network. In this context, the encoder generates a feature vector which vectorially combines numerically parameterizable properties of a pattern.

Different features characteristic of the pattern form the different dimensions of this vector. The totality of the possible feature vectors is referred to as the feature space. Feature vectors facilitate automatic classification because they greatly reduce the number of properties to be classified.

For example, only one vector of a predetermined number of numbers has to be considered instead of a complete image. Subsequently, an artificial neural network assigns the feature vector generated by the encoder to a previously created codebook vector.

The method further includes receiving S2, by a variational autoencoder VAE1 of the first level of hierarchy E1, a first data set DS1 of sensor data including distance information I1, in particular synthetically generated and captured real sensor data SSD, RSD, from the environment sensor of the vehicle.

Alternatively, for example, only synthetic or captured real sensor data SSD, RSD may be used.

The variational autoencoder VAE1 of the first level of hierarchy E1 assigns global features GM of the first data set DS1 of sensor data to a first codebook vector CBV1.

The method further includes receiving S3, by a variational autoencoder VAE2 of the second level of hierarchy E2, the first data set DS1 of sensor data from the environment sensor of the vehicle. The variational autoencoder VAE2 of the second level of hierarchy E2 assigns local features LM of the first data set DS1 of sensor data to a second codebook vector CBV2.

Global features GM of the first data set are understood to be coarse features. Since the present embodiment concerns synthetic sensor data from an environment sensor of a vehicle, global or coarse features of the first data set DS1 are thus understood to be the objects included in the graphic data or LiDAR point cloud that are recognized as such.

These may be, for example, buildings, stationary or moving vehicles, vegetation, traffic signs, people, or the like.

Local features LM are understood to be fine features of objects included in the synthetic sensor data from the environment sensor, in particular the LiDAR sensor, of the vehicle. Fine features can, for example, make it possible to distinguish a type of the objects. This means, for example, a distinction between the type of pedestrian, such as a classification of age and/or gender, the identification of a vehicle type, such as a passenger car, a two-wheeled vehicle or a commercial vehicle, or a vegetation type.

The method further includes conditioning S4 a first feature vector MV1 encoded by the variational autoencoder VAE1 of the first level of hierarchy E1 and a second feature vector MV2 encoded by the variational autoencoder VAE2 of the second level of hierarchy E2 with a second data set DS2 of sensor data from the environment sensor of the vehicle, the second data set DS2 including distance and intensity information I1, I2.

This is followed by combining S5 the conditioned first feature vector MV1 and the conditioned second feature vector MV2 into a resulting third feature vector MV3, and decoding S6 the resulting third feature vector MV3 to generate a third data set DS3 of synthetic sensor data SSD from the environment sensor of the vehicle, the third data set DS3 including superimposed distance and intensity information I1, I2.

With reference to FIG. 2, the following is a description of a sequence of a method for generating synthetic sensor data SSD from an environment sensor of a vehicle, the synthetic sensor data SSD including superimposed distance and intensity information I1, I2. Initially, the first data set DS1 of sensor data is encoded by a first encoder ENC1 of the hierarchical variational autoencoder HVAE. In this process, an image resolution of the first data set DS1 is reduced by a predetermined factor, in particular $2^4$.

The first data set DS1 of sensor data encoded by the first encoder ENC1 is then divided into the first level of hierarchy E1 and the second level of hierarchy E2.

In the first level of hierarchy E1, the first data set DS1 of sensor data is encoded by a second encoder ENC2 of the hierarchical variable autoencoder HVAE. In this process, an image resolution of the first data set DS1 is further reduced by a predetermined factor, in particular $2^2$.

The first data set DS1 of sensor data encoded into a first feature vector MV1 by the second encoder ENC2 is then assigned to the first codebook vector CBV1 which has the smallest distance to the first feature vector MV1, the assignment being performed by a first autoregressive artificial neural network KNN1, in particular an artificial convolutional neural network, of the first level of hierarchy E1.

Subsequently, the first codebook vector CBV1 is decoded by a first decoder DEC1 of the hierarchical variational autoencoder HVAE. In this process, the image resolution of the first codebook vector CBV1 is increased by a predetermined factor, in particular $2^2$.

The first data set DS1 output by the first decoder DEC1 of the first level of hierarchy E1 and the first data set DS1 encoded by the first encoder ENC1 of the hierarchical variational autoencoder HVAE are combined into the resulting third feature vector MV3 in the second level of hierarchy E2.

The resulting third feature vector MV3 is assigned to the second codebook vector CBV2 which has the smallest distance to the resulting third feature vector MV3, the assignment being performed by a second autoregressive artificial neural network KNN2, in particular an artificial convolutional neural network, of the second level of hierarchy E2.

The second codebook vector CBV2 which has the smallest distance to the resulting third feature vector MV3 has a greatest degree of similarity compared to other codebook vectors of the codebook or table. Frequently used measures of distance are, for example, the Euclidean distance, the weighted Euclidean distance and/or the Mahalanobis distance.

Further, the second set DS2 of sensor data from the environment sensor of the vehicle is encoded by a third encoder ENC3 in the third level of hierarchy E3. In this process, an image resolution of the second data set DS2 is reduced by a predetermined factor, in particular $2^8$.

The second data set DS2 of sensor data encoded into a fourth feature vector MV4 by the third encoder ENC3 is assigned to a third codebook vector CBV3 which has the smallest distance to the fourth feature vector MV4 of the second data set DS2, the assignment being performed by a third autoregressive artificial neural network KNN3, in particular an artificial convolutional neural network, of the third level of hierarchy E3.

Subsequently, the third codebook vector CBV3 is decoded by a second decoder DEC2 of the hierarchical variational autoencoder HVAE or by the external variational autoencoder. The second data set DS2 output by the second decoder DEC2 conditions the first feature vector MV1 encoded by the variational autoencoder VAE1 of the first level of hierarchy E1 and the second feature vector MV2 encoded by the variational autoencoder VAE2 of the second level of hierarchy E2.

Furthermore, the first feature vector MV1 encoded by the variational autoencoder VAE1 of the first level of hierarchy E1 and the second feature vector MV2 encoded by the variational autoencoder VAE2 of the second level of hierarchy E2 are conditioned with a data set label K. The data set label K indicates whether the sensor data is synthetically generated or captured real sensor data SSD, RSD.

The second feature vector MV2 encoded by the second variational autoencoder VAE2 of the second level of hierarchy E2 is then once more combined with the third data set DS3 of the first level of hierarchy E1.

The resulting vector is decoded by a third decoder DEC3, thereby generating the synthetic sensor data SSD from the environment sensor, in particular the LiDAR sensor, of the vehicle, the synthetic sensor data SSD including superimposed distance and intensity information I1, I2.

The generation of synthetic sensor data from the environment sensor of the vehicle thus includes transforming the input data received by the hierarchical variational autoencoder (i.e., the first data set DS1) by conditioning with the second data set DS2 to generate the third data set DS3, which includes improved intensity information I2 in addition to the distance information I1 contained in the first data set DS1.

Figures 3, 4:
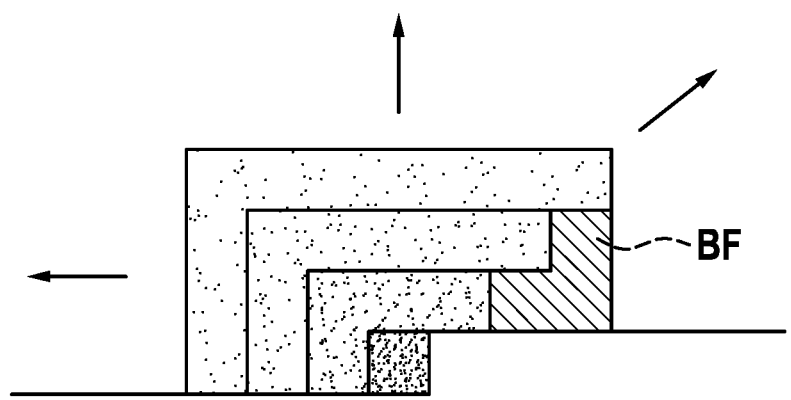
FIG. 3 is an exemplary matrix used for modeling an objective function in accordance with an embodiment of the invention.
FIG. 4 is a representation of a receptive field with a blind spot of a conventional model.

FIG. 3 shows an exemplary matrix of the autoregressive artificial neural network KNN1, KNN2, in particular of the artificial convolutional neural network, of the first level of hierarchy E1 and the second level of hierarchy E2. The artificial convolutional neural network uses the masked convolution shown in FIG. 3. Pixels Z are given an order, namely a numerical order from left to right, starting at the top right and ending at the bottom. The probability of a next pixel depends on the pixel(s) created previously. The model cannot read pixels below or to the right of the current pixel to make its predictions. As can be seen in FIG. 4, conventional artificial neural convolutional networks used for pixel generation usually have a blind spot BF in the receptive field that cannot be used to make predictions.

Figure 5:
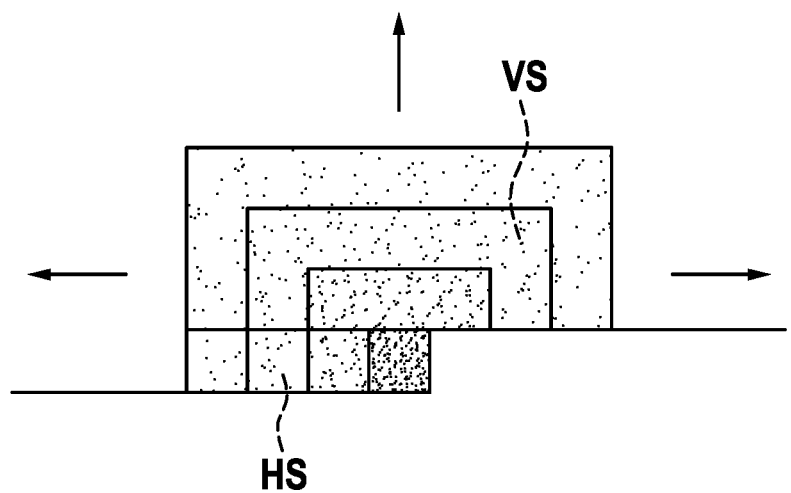
FIG. 5 is a representation of a receptive field of a model or of an artificial neural network in accordance with an embodiment of the invention.

According to the present invention (see FIG. 5), two convolutional stacks, namely a horizontal stack and a vertical stack, are used which allow for capturing the whole receptive field.

Thus, the blind spot in the receptive field can be removed by combining the two convolutional network stacks. In this context, the horizontal stack conditions the current row up to the current pixel. The vertical stack conditions all rows above. The vertical stack, which does not have any masking, allows the receptive field to grow in a rectangular fashion without any blind spot, and to combine the outputs of the two stacks after each layer.

Every time a pixel is predicted, it is fed back into the convolutional neural network to predict the next pixel. This sequentiality facilitates generating high-quality images, as it allows every pixel to depend in a highly non-linear and multimodal way on the previous pixels.

Every layer in the horizontal stack takes as input the output of the previous layer as well as that of the previous stack.

Figure 6:
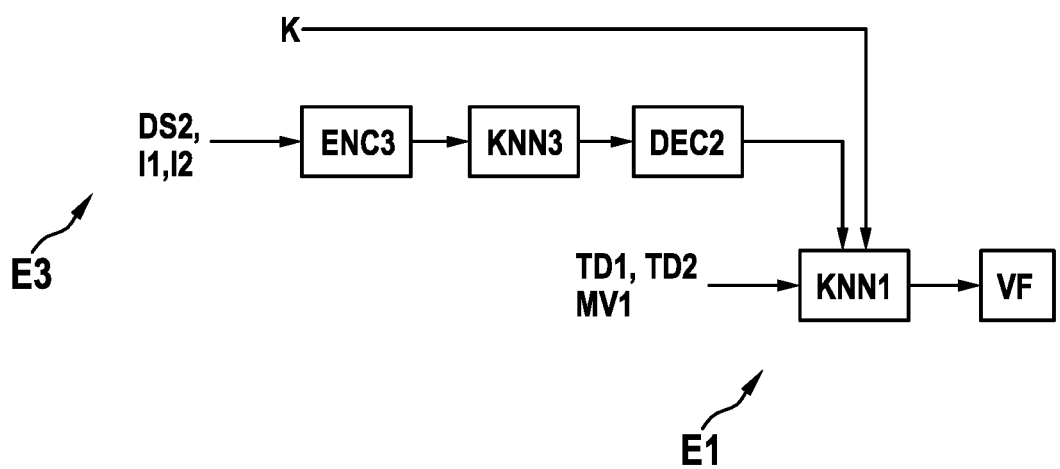
FIG. 6 is a flow diagram for training a first level of hierarchy of a hierarchical variational autoencoder in accordance with an embodiment of the invention.
Figure 7:
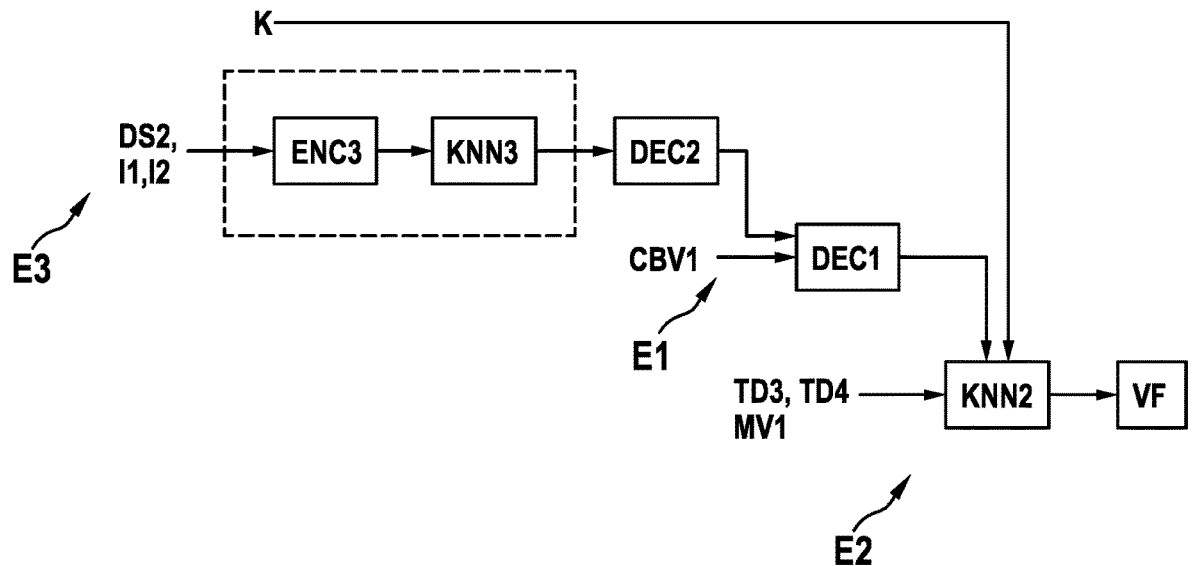
FIG. 7 is a flow diagram of a method for training a second level of hierarchy of a hierarchical variational autoencoder in accordance with an embodiment of the invention.
Figure 8:
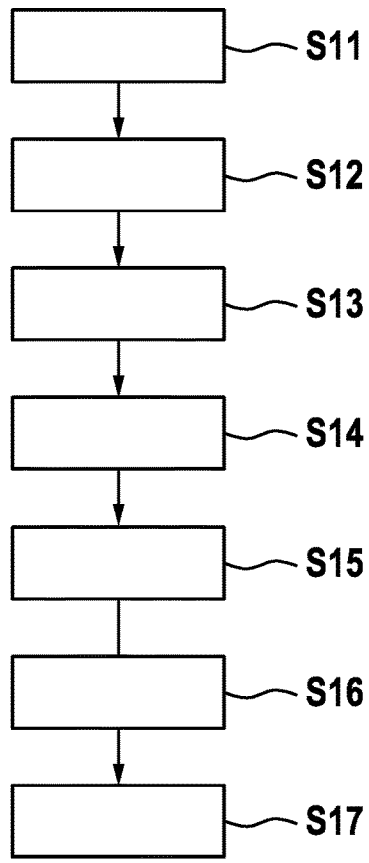
FIG. 8 is a flow diagram of a method for providing a trained machine learning algorithm for generating synthetic sensor data from an environment sensor in accordance with an embodiment of the invention.

FIG. 6 shows a flow diagram for training a first level of hierarchy of a hierarchical variational autoencoder in accordance with an embodiment of the invention. FIG. 7 shows a flow diagram of a method for training a second level of hierarchy of the hierarchical variational autoencoder in accordance with an embodiment of the invention, and FIG. 8 shows a flow diagram of a method for providing a trained machine learning algorithm for generating synthetic sensor data from the environment sensor in accordance with an embodiment of the invention.

The following is a description of a method for training the first level of hierarchy E1 and the second level of hierarchy E2 of the hierarchical variational autoencoder HVAE.

The method includes providing S11 a hierarchical variational autoencoder HVAE having the first level of hierarchy E1 and the second level of hierarchy E2. In the present exemplary embodiment, the third level of hierarchy E3 is also part of the hierarchical variational autoencoder HVAE.

Alternatively, the third level of hierarchy E3 may, for example, not be part of the hierarchical variational autoencoder HVAE.

The method further includes receiving S12, S13 input training data TD1 and output training data TD2 of a first autoregressive artificial neural network KNN1, in particular of an artificial convolutional neural network, of the first level of hierarchy E1.

The method also includes training S14 the first autoregressive artificial neural network KNN1, in particular the artificial convolutional neural network, of the first level of hierarchy E1 to assign global features GM of the input training data TD1 to a first codebook vector CBV1.

Codebook vectors are generated using the method of vector quantization. Vector quantization includes two steps. In the first step (training), a table or codebook containing frequently occurring feature vectors is created. In the second step, the codebook vector having the smallest distance is determined for each of additional vectors.

For data transmission, only the index of the codebook vector is needed, which can also be a vector if the codebook is multidimensional. The corresponding decoder has the same codebook and can then generate an approximation of the original vector from the index.

The method further includes receiving S15, S16 input training data TD3 and output training data TD4 of a second autoregressive artificial neural network KNN2, in particular of an artificial convolutional neural network, of the second level of hierarchy E2.

Furthermore, the method includes training S17 the second autoregressive artificial neural network KNN2, in particular the artificial convolutional neural network, of the second level of hierarchy E2 to assign local features LM of the input training data TD3 to a second codebook vector CBV2. In this context, the second autoregressive artificial neural network KNN2 of the second level of hierarchy E2 is conditioned by the autoregressive artificial neural network KNN1 of the first level of hierarchy E1.

Although specific embodiments have been illustrated and described herein, it will be appreciated by those of ordinary skill in the art that a variety of alternative and/or equivalent implementations exist. It should be appreciated that the exemplary embodiment or exemplary embodiments are only examples, and are not intended to limit the scope, applicability, or configuration in any way.

Rather, the foregoing summary and detailed description will provide those skilled in the art with a convenient road map for implementing at least one exemplary embodiment, it being understood that various changes may be made in the function and arrangement of elements without departing from the scope as set forth in the appended claims and their legal equivalents.

Generally, this application is intended to cover any modifications, adaptations or variations of the specific embodiments discussed herein.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating synthetic sensor data corresponding to a LiDAR sensor of a vehicle, the synthetic sensor data including superimposed distance and intensity information, the method comprising:

providing a hierarchical variational autoencoder, wherein the hierarchical variational autoencoder has a first level of hierarchy and a second level of hierarchy, and wherein the hierarchical variational autoencoder has a third level of hierarchy or is configured to communicate with a third level of hierarchy of an external variational autoencoder;

receiving, by a variational autoencoder of the first level of hierarchy, a first data set of LiDAR sensor data including distance information, wherein the first data set comprises synthetically generated and/or captured real sensor data, the variational autoencoder of the first level of hierarchy assigning global features of the first data set to a first codebook vector;

receiving, by a variational autoencoder of the second level of hierarchy, the first data set, the variational autoencoder of the second level of hierarchy assigning local features of the first data set to a second codebook vector;

conditioning a first feature vector encoded by the variational autoencoder of the first level of hierarchy and a second feature vector encoded by the variational autoencoder of the second level of hierarchy with a second data set of LiDAR sensor data from the LiDAR sensor of the vehicle, the second data set including distance and intensity information;

combining the conditioned first feature vector and the conditioned second feature vector into a resulting third feature vector; and decoding the resulting third feature vector to generate a third data set of synthetic LiDAR sensor data, the third data set including superimposed distance and intensity information;

wherein the first data set is encoded by a first encoder of the hierarchical variational autoencoder, wherein the encoding by the first encoder reduces an image resolution of the first data set;

wherein the first data set encoded by the first encoder is divided into the first level of hierarchy and the second level of hierarchy, wherein the first level of hierarchy of the first data set is further encoded by a second encoder of the hierarchical variational autoencoder, and wherein the encoding by the second encoder reduces the image resolution of the first data set;

wherein the first data set is encoded into the first feature vector by the second encoder. and wherein the first feature vector is assigned to the first codebook vector, which has the smallest distance to the first feature vector, by a first artificial convolutional neural network of the first level of hierarchy.

2. The method according to claim 1, wherein the first codebook vector is decoded by a first decoder of the hierarchical variational autoencoder, wherein the decoding by the first decoder increases an image resolution of the first codebook vector.

3. The method according to claim 2, wherein the first data set is output by the first decoder, and wherein the first data set output by the first decoder and the first data set encoded by the first encoder of the hierarchical variational autoencoder are combined into the resulting third feature vector in the second level of hierarchy.

4. The method according to claim 3, wherein the resulting third feature vector is assigned to the second codebook vector, which has the smallest distance to the resulting third feature vector, by a second artificial convolutional neural network of the second level of hierarchy.

5. The method according to claim 1, wherein the second data set from the LiDAR sensor of the vehicle is encoded by a third encoder in the third level of hierarchy of the hierarchical variational autoencoder or the external variational autoencoder, wherein the encoding by the third encoder reduces an image resolution of the second data set.

6. The method according to claim 5, wherein the second data set is encoded into a fourth feature vector by the third encoder, and wherein the fourth feature vector is assigned to a third codebook vector, which has the smallest distance to the fourth feature vector of the second data set, by a third artificial convolutional neural network of the third level of hierarchy of the hierarchical variational autoencoder or the external variational autoencoder.

7. The method according to claim 6, wherein the third codebook vector is decoded by a second decoder of the hierarchical variational autoencoder or the external variational autoencoder, wherein the second data set is output by the second decoder, and wherein the second data set conditions the first feature vector encoded by the variational autoencoder of the first level of hierarchy and the second feature vector encoded by the variational autoencoder of the second level of hierarchy.

8. The method according to claim 1, wherein the first feature vector encoded by the variational autoencoder of the first level of hierarchy and the second feature vector encoded by the variational autoencoder of the second level of hierarchy are conditioned with a data set label, the data set label indicating whether corresponding sensor data is synthetically generated or captured real sensor data.

9. A non-transitory computer-readable medium having processor-executable instructions stored thereon for generating synthetic sensor data corresponding to a LiDAR sensor of a vehicle, the synthetic sensor data including superimposed distance and intensity information, wherein the processor-executable instructions, when executed, facilitate performance of the following:

providing a hierarchical variational autoencoder, wherein the hierarchical variational autoencoder has a first level of hierarchy and a second level of hierarchy, and wherein the hierarchical variational autoencoder has a third level of hierarchy or is configured to communicate with a third level of hierarchy of an external variational autoencoder;

receiving, by a variational autoencoder of the first level of hierarchy, a first data set of LiDAR sensor data including distance information, wherein the first data set comprises synthetically generated and/or captured real sensor data, the variational autoencoder of the first level of hierarchy assigning global features of the first data set to a first codebook vector;

receiving, by a variational autoencoder of the second level of hierarchy, the first data set, the variational autoencoder of the second level of hierarchy assigning local features of the first data set to a second codebook vector;

conditioning a first feature vector encoded by the variational autoencoder of the first level of hierarchy and a second feature vector encoded by the variational autoencoder of the second level of hierarchy with a second data set of LiDAR sensor data from the LiDAR sensor of the vehicle, the second data set including distance and intensity information;

combining the conditioned first feature vector and the conditioned second feature vector into a resulting third feature vector; and decoding the resulting third feature vector to generate a third data set of synthetic LiDAR sensor data, the third data set including superimposed distance and intensity information;

wherein the first data set is encoded by a first encoder of the hierarchical variational autoencoder, wherein the encoding by the first encoder reduces an image resolution of the first data set;

wherein the first data set encoded by the first encoder is divided into the first level of hierarchy and the second level of hierarchy, wherein the first level of hierarchy of the first data set is further encoded by a second encoder of the hierarchical variational autoencoder. and wherein the encoding by the second encoder reduces the image resolution of the first data set;

wherein the first data set is encoded into the first feature vector by the second encoder. and wherein the first feature vector is assigned to the first codebook vector, which has the smallest distance to the first feature vector, by a first artificial convolutional neural network of the first level of hierarchy.

10. A method for generating synthetic sensor data corresponding to a LiDAR sensor of a vehicle, the synthetic sensor data including superimposed distance and intensity information, the method comprising:

providing a hierarchical variational autoencoder, wherein the hierarchical variational autoencoder has a first level of hierarchy and a second level of hierarchy, and wherein the hierarchical variational autoencoder has a third level of hierarchy or is configured to communicate with a third level of hierarchy of an external variational autoencoder;

receiving, by a variational autoencoder of the first level of hierarchy, a first data set of LiDAR sensor data including distance information, wherein the first data set comprises synthetically generated and/or captured real sensor data, the variational autoencoder of the first level of hierarchy assigning global features of the first data set to a first codebook vector;

receiving, by a variational autoencoder of the second level of hierarchy, the first data set, the variational autoencoder of the second level of hierarchy assigning local features of the first data set to a second codebook vector;

conditioning a first feature vector encoded by the variational autoencoder of the first level of hierarchy and a second feature vector encoded by the variational autoencoder of the second level of hierarchy with a second data set of LiDAR sensor data from the LiDAR sensor of the vehicle, the second data set including distance and intensity information;

combining the conditioned first feature vector and the conditioned second feature vector into a resulting third feature vector; and decoding the resulting third feature vector to generate a third data set of synthetic LiDAR sensor data, the third data set including superimposed distance and intensity information;

wherein the second data set from the LiDAR sensor of the vehicle is encoded by a third encoder in the third level of hierarchy of the hierarchical variational autoencoder or the external variational autoencoder, wherein the encoding by the third encoder reduces an image resolution of the second data set;

wherein the second data set is encoded into a fourth feature vector by the third encoder, and wherein the fourth feature vector is assigned to a third codebook vector, which has the smallest distance to the fourth feature vector of the second data set, by a third artificial convolutional neural network of the third level of hierarchy of the hierarchical variational autoencoder or the external variational autoencoder.

* * * * *